United States Patent [19]

Meyer et al.

[11] Patent Number: 5,162,406
[45] Date of Patent: Nov. 10, 1992

[54] POLYMER STABILIZING COMPOSITIONS

[75] Inventors: Wendell W. Meyer; Grace Y. Lo, both of Midland, Mich.

[73] Assignee: The Dow Chemical Company, Midland, Mich.

[21] Appl. No.: 134,393

[22] Filed: Dec. 17, 1987

[51] Int. Cl.$^5$ .......................... C08K 5/50; C08K 5/53
[52] U.S. Cl. .................... 524/101; 524/126; 524/343
[58] Field of Search ......................... 524/101, 126, 343

[56] References Cited

U.S. PATENT DOCUMENTS

| | | | |
|---|---|---|---|
| 2,731,442 | 1/1956 | Forman | 524/270 |
| 2,733,226 | 1/1956 | Hunter | 524/114 |
| 3,251,905 | 5/1966 | Zelinski | 525/272 |
| 3,520,952 | 7/1970 | Hecker et al. | 524/127 |
| 3,531,483 | 9/1970 | Gilles | 524/100 |
| 3,535,249 | 10/1970 | Larson | 524/343 |
| 3,554,964 | 1/1971 | Miller | 524/151 |
| 3,629,372 | 12/1971 | Drake | 524/128 |
| 3,637,582 | 9/1972 | Gilles | 524/100 |
| 3,702,837 | 11/1972 | Gilles | 524/100 |
| 3,825,629 | 7/1974 | Hofer et al. | 558/156 |
| 3,837,994 | 9/1974 | Flanagan et al. | 428/122 |
| 4,000,221 | 12/1976 | Fodor | 524/151 |
| 4,025,486 | 5/1977 | Gilles | 252/400 A |
| 4,049,654 | 9/1977 | Spivack | 524/101 |
| 4,075,163 | 2/1978 | Hofer et al. | 106/177 |
| 4,120,915 | 10/1978 | Fodor et al. | 524/151 |
| 4,154,719 | 3/1979 | Abolins et al. | 524/100 |
| 4,233,207 | 11/1980 | Spivack | 524/115 |
| 4,292,414 | 9/1981 | Saito et al. | 525/255 |
| 4,371,647 | 1/1981 | Minagawa et al. | 524/120 |
| 4,427,814 | 1/1984 | Sugio et al. | 524/126 |
| 4,427,837 | 1/1984 | Tung et al. | 525/314 |
| 4,439,570 | 3/1984 | Messina et al. | 524/154 |
| 4,444,929 | 4/1984 | Chaser | 524/101 |
| 4,472,548 | 9/1984 | Son et al. | 524/126 |
| 4,474,914 | 9/1984 | Spivack | 524/100 |

FOREIGN PATENT DOCUMENTS 64259 10/1982 European Pat. Off. .
56-120752 9/1981 Japan .
57-105452 6/1982 Japan .
58-21444 2/1983 Japan .

OTHER PUBLICATIONS

Chem Abst. 87:24223 (Japan Kokai 7732942 Mar. 12, 1977).
Chem Abst. 96:7611r (Eur Pat Appl. EP36278 Sep. 23, 1981).
Chem Abst. 96:7648h (Jap. Kokai Tokkyo Koho JP 8203,842 Jan. 9, 1982).
Chem Abst. 96:200773y (Jap. Kokai Tokkyo Koho JP 8208236 Jan. 16, 1982).
Chem Abst. 97:7299r (Jap Kokai Tokkyo Koho JP8214646 Jan. 25, 1982).
Chem Abst. 97:128621y (Jpn Kokai Tokkyo Koho JP8257736 Apr. 7, 1982).
Chem Abst. 98:17528z.
Chem Abst. 100:23261h.
Chem Abts. 100:211062t.
Derwent Abst. 84:025192.
Rubber World, Oct. 1983, "Stabilization of Thermoplastic Elastomers" Mak, et al. Journal of Applied Polymer Science, vol. 27, pp. 951–955 (1982).
European Polymer Journal, vol. 8, pp. 75–82 (1972).

Primary Examiner—Kriellion S. Morgan

[57] ABSTRACT

A stabilized composition of matter comprises: (a) at least one block polymer comprising at least one nonelastomeric block and at least one polybutadiene block and (b) a stabilizing composition in an amount effective to improve heat or oxidative stability of the block polymer, said composition comprising (i) at least one hydroxyphenylalkylenyl isocyanurate and (ii) at least one polyphenylene diphosphonite. An alkylidene bisphenol is optionally added to achieve improved color stability.

43 Claims, No Drawings

POLYMER STABILIZING COMPOSITIONS

This invention relates to compositions useful in improving the stability of diene block polymers, and to stabilized diene block polymer compositions incorporating such compositions.

BACKGROUND OF INVENTION

Diene block polymers are materials that are useful for packaging, tires, shoe soles, adhesives and the like. Block polymers comprising at least one poly(vinyl aromatic) block and at least one polymerized diene block are referred to herein as diene block polymers. When the polymerized diene is polybutadiene the polymers are referred to herein as polybutadiene block polymers. Diene block polymers generally have non-elastomeric, poly(vinyl aromatic) end blocks and at least one elastomeric center block of polymerized conjugated diolefin, which diolefins are referred to herein as dienes. Properties of the diene block polymers depend on the quantity and composition of each block. When the polydiene block content comprises less than about half the weight of the block polymer, the copolymers are tough, non-elastomeric plastics. As the polydiene content increases, elastomeric qualities of the copolymer increase. Diene block polymers having more than about 50 percent by weight of polydiene blocks are considered thermoplastic elastomers. Such copolymers and their preparation are described in U.S. Pat. Nos. 3,251,905 to Zelinski; 3,265,765 to Holden et al.; 3,299,174 to Kuhre et al.; 3,231,635 to Holden et al.; 4,427,837 to Tung et al.; and Canadian Patent 50,466 to Milkovich. The teachings of each of which patents are incorporated herein by reference. These block polymers have physical properties much like other types of elastomers, yet they can be processed using processing equipment commonly used for thermoplastics. In other words, they can be injection molded, vacuum formed, blow molded, extruded, and the like.

Thermal qualities of diene block polymers have limited their industrial application. Polydiene in the copolymers generally leads to inherent instability of physical properties at elevated temperatures. Deterioration, that is, crosslinking, oxidation and degradation of physical properties, is observed when diene block polymers are heated sufficiently for common processing, such as in molding and the like, especially when the heating is in the presence of oxygen. Yellowing of the copolymer is also frequently observed. Thus, for example, when diene block polymers such as those composed of styrene and butadiene are subjected to elevated processing temperatures, they often lose flexibility; and objects molded from them show surface crazing. The loss of flexibility is thought to result from crosslinking of the polydiene blocks. Many block polymers of poly(vinyl aromatics) and polydienes are formed in solution and must be heated to remove the solvent. Even this heating may promote crosslinking and deterioration. Deterioration observed on exposure to heat is referred to herein as thermal deterioration. Resistance to thermal deterioration is referred to herein as heat stability, or thermal stability. Thermal stability is often decreased by exposure to oxygen. Resistance to deterioration on exposure to oxygen is referred to herein as oxidative stability.

Triblock elastomeric copolymers with conjugated diolefin midsections and end blocks which incorporate alkylated vinyl aromatics have higher heat distortion temperatures than the corresponding copolymers with polystyrene end blocks. Processing such polymers, therefore, requires higher temperatures than does processing of the corresponding styrene block polymers. For instance, common processing temperatures for styrene block polymers are in the range of about 100° C. to about 250° C. Processing block polymers having alkyl vinyl aromatic monomers in their end blocks usually requires temperatures at least about 20° C. higher than corresponding styrene block polymers. Processing at such temperatures causes substantial deterioration of unstabilized diene block polymers especially when they are also exposed to oxygen. Stabilizers and stabilizer systems known to these skilled in the art are not adequate to prevent substantial oxidation, crosslinking, surface and physical deterioration of alkylated vinyl aromatic block polymer exposed to such processing temperatures. Additional demands are placed on stabilizer systems when the copolymers are exposed to oxygen and heat in the preparation thereof. Such exposure is believed to start deterioration mechanisms that are continued and accelerated in subsequent processing.

A variety of stabilizers has been proposed for stabilizing diene block polymers. The use of tris(nonylphenyl) phosphite and 2,6-di-t-butyl-4-methylphenol in compositions of, optionally modified, block polymers having polystyrene and polybutadiene or polyisoprene blocks is disclosed in U.S. Pat. Nos. 4,120,915 and 4,292,414. Radial block polymers of butadiene and styrene have been stabilized with combinations of hindered phenols or alkylene bisphenols and substituted aromatic secondary amines, having at least two alkyl groups, at least one of which is ortho to the amine group, on each of two phenyl groups bonded to the amine nitrogen as disclosed in U.S. Pat. No. 3,629,372. Similar radial block polymers have also been stabilized with combinations of hindered phenols, organic phosphites and nitrogen-containing compounds as disclosed in U.S. Pat. No. 4,000,221. Deterioration physical properties of styrene-butadiene-styrene block polymers stabilized with such antioxidants as tetrakis[methylene(3,5-di-tert-butyl-4-hydroxyhydrocinnamate)]methane, dilaurylthiodipropionate, 2-(2'-hydroxy-5'-methyl phenyl)benzotriazole, 2-hydroxy-4-n-octoxybenzophenone, 1,2,3-tris(3,5-di-t-butyl-4-hydroxybenzyl)isocyanurate, and the like and mixtures thereof is illustrated, for instance, in "Stabilization of Thermoplastic Elastomers," by C. Mak, et al, in *Rubber World*, Oct., 1983, pp. 220–223. Generally, utility of these stabilizers is limited with respect to the type of polymer with which they are effective or with respect to the temperature range for which they are useful.

In view of the difficulties in stabilizing diene block polymers at temperatures desirably used in their processing, it would be useful to provide a stabilizing composition effective to stabilize diene block polymers against deterioration caused by exposure to elevated temperatures, especially those temperatures encountered in processing butadiene block polymers having alpha-methylstyrene/styrene copolymer blocks. Further, it would be useful to provide such a stabilizing composition that is effective even when the diene block polymers are exposed to oxygen and heat in recovering and processing of the copolymers.

SUMMARY OF THE INVENTION

The stabilizing compositions of the invention enhance stability of diene block polymers exposed to temperatures and oxygen commonly encountered in processing block polymers.

In one aspect this invention is a stabilized composition of matter comprising: (a) at least one block polymer comprising at least one non-elastomeric block and at least one polybutadiene block and (b) a stabilizing composition in an amount effective to improve heat stability of the block polymer, said composition comprising (i) at least one hydroxyphenylalkylenyl isocyanurate of the formula:

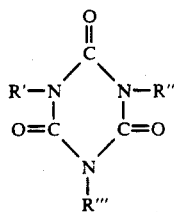

Formula I wherein R' is a hydroxyphenylalkylenyl radical of the formula:

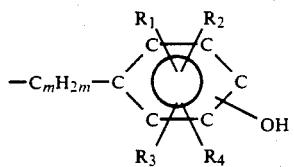

Formula II where m is an integer of from 1 to about 4, $R_1$ is an alkyl radical having from 1 to about 20 carbon atoms, which alkyl radical is unsubstituted or inertly substituted, and is positioned immediately adjacent to the hydroxy group on the ring; each of $R_2$, $R_3$, and $R_4$ are independently selected from the group consisting of hydrogen and alkyl, aryl or alkylaryl radicals containing from 1 to about 20 carbon atoms, which alkyl, aryl or alkylaryl radicals are unsubstituted or inertly substituted; and R" and R''' are independently selected from the group consisting of hydrogen, and alkyl radicals containing from 1 to about 20 carbon atoms, which alkyl radicals are unsubstituted or inertly substituted, and groups described by Formula II; and (ii) at least one polyphenylene diphosphonite of the formula:

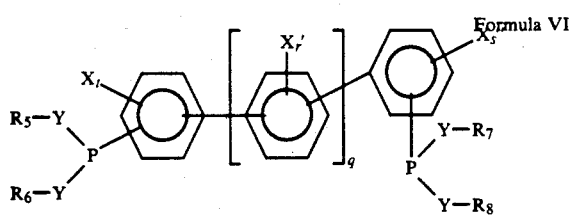

Formula VI wherein each of $R_5$, $R_6$, $R_7$ and $R_8$, is, independently, an unsubstituted hydrocarbon radical or inertly substituted hydrocarbon radical; Y is oxygen or sulfur; q is 0 or 1; X, X', X" are independently, hydrogens, or inert substituents; and r, s and t are integers from 1 to about 4. The beneficial properties of the stabilizing composition are enhanced when the composition additionally comprises an effective amount of (iii) at least one alkylidene bisphenol of the formula:

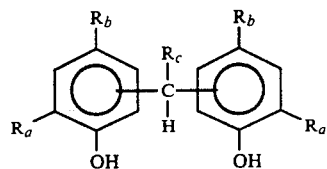

FORMULA VI wherein $R_c$ is hydrogen or an alkyl radical having from 1 to about 8 carbon atoms, which radical is unsubstituted or inertly substituted, $R_a$ is hydrogen or an alkyl radical having from about 4 to about 9 carbon atoms, which radical is unsubstituted or inertly substituted; and $R_b$ is an alkyl radical having from about 4 to about 9 carbon atoms, which radical is unsubstituted or inertly substituted.

In another aspect, the invention is the process of enhancing the resistance of polybutadiene block polymers to deterioration on exposure to heat, oxygen or combinations thereof comprising mixing therewith a stabilizing composition comprising at least one hydroxyphenylalkylenyl isocyanurate of Formulas I and II and at least one polyphenylene diphosphonite of Formula IV. The process, optionally and beneficially, also comprises mixing with the polybutadiene block polymer at least one alkylidene bisphenol of Formula VI.

In yet another aspect, the invention is a stabilizing composition of matter for enhancing the resistance of polybutadiene block polymers to deterioration on exposure to heat, oxygen or combinations thereof comprising at least one hydroxyphenylalkylenyl isocyanurate of Formulas I and II, and at least one polyphenylene diphosphonite of Formula IV. The stabilizing composition, optionally, also comprises an at least one alkylidene bisphenol of Formula VI.

The combination of hydroxyphenylalkylenyl isocyanurates and polyphenylene diphosphonites impart exceptional thermal stability to diene block polymers which, without stabilization, tend to deteriorate in physical properties largely because of crosslinking and oxidation of the unsaturated portions of the molecule. Improvement in thermal stability imparted by the stabilizing composition of the invention is particularly evident when the composition is used with diene block polymers which are exposed to harsh conditions such as elevated temperatures, oxygen and the like, before addition of the stabilizing composition. In the case of exposure to oxygen and/or heat before stabilization, deterioration is believed to be initiated in the polymer, but not generally to progress to an observable extent. Subsequent exposure to elevated temperatures in the absence of very effective stabilizers, such as the stabilizing composition of the invention, causes accelerated deterioration which quickly results in observable changes in physical properties.

Polymer compositions stabilized by compositions comprising a hydroxyphenylalkylenyl isocyanurate and a polyphenylene diphosphonite, while stabilized against such deterioration, often show discoloration (generally yellowing) on exposure to elevated temperatures. Surprisingly, the alkylidene bisphenols described above impart good color stability when used with the diphosphonite and isocyanurate compositions of the invention. Several other common phenolic stabilizers do not impart similar color stability.

DETAILED DESCRIPTION OF THE INVENTION

A. Hydroxyphenylalkylenyl isocyanurates.

Hydroxyphenylalkylenyl isocyanurates which are suitable for use in this invention are represented by the formula:

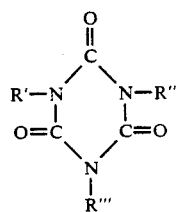

Formula I wherein R' is a hydroxyphenylalkylenyl radical of the formula:

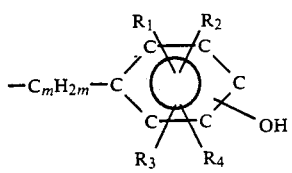

Formula II where m is an integer of from 1 to about 4, $R_1$ is an alkyl radical having from 1 to about 20 carbon atoms, which alkyl radical is unsubstituted or inertly substituted, and is positioned immediately adjacent (that is, ortho to) the hydroxy group on the ring; each of $R_2$, $R_3$, and $R_4$ are independently selected from the group consisting of hydrogen and alkyl, aryl, or alkylaryl radicals having from 1 to about 20 carbon atoms, which alkyl, aryl or alkylaryl radicals are unsubstituted or inertly substituted; and each of R" and R''' are independently selected from the group consisting of hydrogen, alkyl radicals having from 1 to about 20 carbon atoms, which alkyl radicals are unsubstituted or inertly substituted, and groups described by Formula II.

R" and R''' are preferably hydroxyphenylalkylenyl radicals described by Formula II. More preferably, R', R", and R''' are described by Formula II and $R_1$ is a tertiary alkyl radical containing from about 4 to about 12 carbon atoms. Preferably, $R_2$ is an alkyl radical having from 1 to about 12 carbon atoms; $R_3$ and $R_4$ are hydrogen; and m is 1. The hydroxy group of the compound of Formula II is preferably para to the group bridging it to the triazine ring.

The term "inertly substituted" is used herein to denote substitution on a radical which does not react or interact with other groups or molecules present in a stabilized composition such that the composition becomes substantially less stable. Inertly substituted groups generally include groups substituted with alkyl groups or alkoxy groups, preferably such groups having from one to about 6 carbon atoms.

Symmetrical tris(3,5-di-tert-alkyl-4-hydroxybenzyl)isocyanurates of the formula:

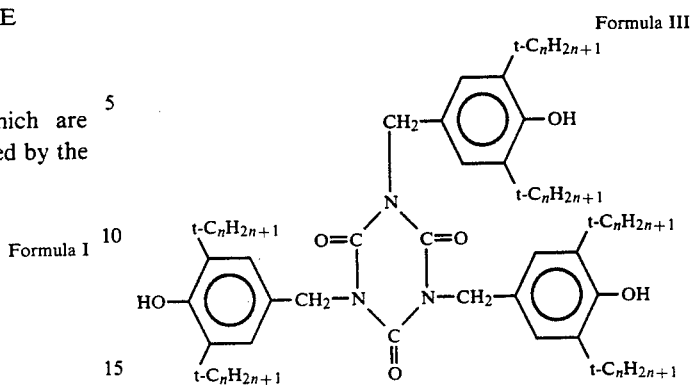

Formula III where t indicates tertiary and n is an integer of from to about 8 are preferred species for use in the practice of the invention; preferably n is 4. When n is 4, the compound is tris-(3,5-di-t-butyl-4-hydroxybenzyl)isocyanurate, also known as tris-(3,5-di-t-butyl-4-hydroxybenzyl) triazinetrione.

Other examples of suitable 4-hydroxybenzyl isocyanurate compounds are: tris-(3-methyl-4-hydroxybenzyl)isocyanurate, tris-(3-t-butyl-4-hydroxybenzyl)isocyanurate, tris-(3-t-amyl-4-hydroxybenzyl)isocyanurate, tris-(3-cetyl-4-hydroxybenzyl)isocyanurate, tris-(3,5-dimethyl-4-hydroxybenzyl)isocyanurate, tris-(3,5-diisopropyl-4-hydroxybenzyl)isocyanurate, tris-(3-methyl-5-isopropyl-4-hydroxybenzyl)isocyanurate, tris-(3-hexyl-4-hydroxybenzyl)isocyanurate, tris-(3-t-butyl-5-t-amyl-4-hydroxybenzyl)isocyanurate, tris-(3,5-di-t-amyl-4-hydroxybenzyl)isocyanurate, tris-[3,5-di-(1-methyl-1-ethylpropyl)-4-hydroxybenzyl]isocyanurate, tris-[3,5-di-(1,1,2,2-tetramethylpropyl)-4-hydroxybenzyl]isocyanurate, tris-[3,5-di-(1-dimethylpentyl)-4-hydroxybenzyl]isocyanurate, bis-(3-methyl-4-hydroxybenzyl)isocyanurate, bis-(3-t-butyl-4-hydroxybenzyl)isocyanurate, bis-(3,5-dimethyl-4-hydroxybenzyl)isocyanurate, bis-(3,5-di-t-butyl-4-hydroxybenzyl)isocyanurate, · (3-methyl-4-hydroxybenzyl)isocyanurate, (3-t-butyl-4hydroxybenzyl)isocyanurate, (3,5-dimethyl-4-hydroxybenzyl)isocyanurate, (3,5-di-t-butyl-4-hydroxybenzyl)isocyanurate, and the like. U.S. Pat. No. 3,531,483 discloses hydroxyphenyalkylenyl isocyanurate compounds useful in this invention and teaches preparation thereof. That patent is incorporated herein by reference.

B. Polyphenylene diphosphonites.

Polyphenylene diphosphonites which are useful in this invention are benzene phosphonous acid compounds in which about two to about four benzene nuclei are bound together and which compounds contain two to three phosphorus atoms. The compounds include those described by the formula:

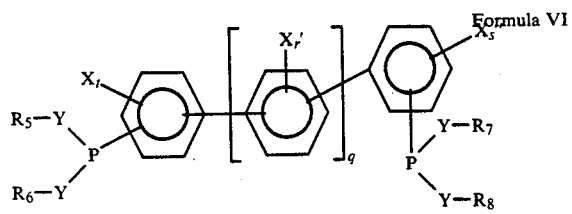

Formula VI wherein each of $R_5$, $R_6$, $R_7$ and $R_8$ is, independently, an unsubstituted hydrocarbon radical or inertly substituted hydrocarbon radical. The hydrocarbon radicals are preferably selected from the group consisting of alkyl groups, cycloalkyl groups, and alkylaryl, said alkyl cycloalkyl or alkylaryl groups having from about 3 to about 20 carbon atoms. Inertly substituted hydrocarbyl groups are those hydrocarbon groups wherein one or more of the hydrogens have been replaced by a group which does not react or interact with other parts of the polyphenylene diphosphonite molecule or other compounds in a composition to reduce substantially the stability of the composition. Y is oxygen or sulfur; and q is 0 or 1; X, X', and X" are independently hydrogens, or inert substituents such as alkyl groups, cycloalkyl groups or alkoxy groups and the like; and r, s and t are integers from one to about four. When any of X, X', or X" are carbon atom-containing groups, each preferably contains from about one to about 10 carbon atoms.

Preferably, each of $R_5$, $R_6$, $R_7$ and $R_8$ contains from about 3 to about 18 carbon atoms. More preferably, each of $R_5$, $R_6$, $R_7$ and $R_8$ contains from about 7 to about 16 carbon atoms. $R_5$, $R_6$, $R_7$, and $R_8$ are more preferably alkylaryl groups, most preferably they are tertiary alkyl substituted phenyl or tertiary alkyl substituted benzyl moieties. Y is preferably oxygen, n is preferably one; X, X', and X''' are preferably hydrogen.

The diphosphonites preferred for use in the practice of the invention are those described by the formula:

3,825,629 and 4,075,163 which are incorporated herein by reference.

C. Alkylidene bisphenols

Alkylidene bisphenols useful in the practice of this invention have the general structure

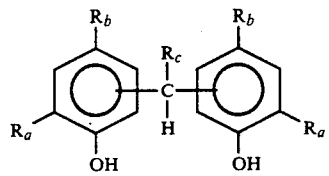

FORMULA VI wherein $R_c$ is hydrogen or an alkyl radical selected from the group consisting of alkyl radicals having from 1 to about 8 carbon atoms, which radicals are unsubstituted or inertly substituted; $R_a$ is selected from the group consisting of hydrogen and alkyl radicals having from about 4 to about 9 carbon atoms which radical is unsubstituted or inertly substituted; and $R_b$ is selected from the group consisting of alkyl radicals having from about 4 to about 9 carbon atoms, which radical is substituted or unsubstituted. $R_c$ is advantageously an unsubstituted alkyl radical. $R_c$ preferably contains from 1 to about 4 carbon atoms and more preferably contains 1 carbon atom. The alkylidene bridge ($-R_cCH-$) is beneficially

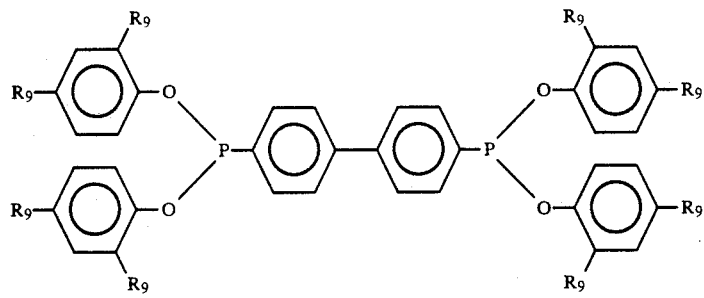

Formula V wherein the $R_9$ groups are identical or different and each represents a linear or branched alkyl group, which is unsubstituted or inertly substituted, having from 1 to about 10 carbon atoms.

The group $R_9$ in the above Formula (V) is optionally a linear alkyl group such as methyl, ethyl, methoxy methyl, propyl, n-butyl, n-pentyl, n-hexyl, n-octyl, n-nonyl or n-decyl and the like. $R_9$ is preferably a branched alkyl group such as iso-propyl, isobutyl, 2-methoxy-iso-butyl, sec-butyl, tert-butyl, iso-amyl, iso-octyl, tert-amyl, tert-octyl, and the like. Advantageously, each $R_9$ is tert-butyl and the compound is tetrakis (2,4-di-t-butylphenyl)-4,4'-biphenylene diphosphonite.

Other examples of suitable diphosphonites of Formula (V) include tetrakis(2,4-dimethylphenyl)-4,4'-biphenylene diphosphonite, tetrakis(2,4-diethylphenyl)-4,4'-biphenylene diphosphonite, tetrakis(2,4-di-n-propylphenyl)-4,4'-biphenylene diphosphonite and tetrakis(2,4-di-isopropylphenyl)-4,4'-biphenylene diphosphonite and the like. These diphosphonites can be produced, for example, by reacting 4,4'-biphenylene diphosphonous acid with the corresponding aromatic hydroxy compounds, such as 2,4-dimethylphenol; 2,4-diethylphenol; 2,4-di-t-butylphenol; 2,4-di-n-propyphenol; or 2,4-di-isopropylphenol. Various polyphenylene diphosphonites useful in the practice of the invention are commercially available. Preparation of polyphenylene diphosphonites is taught in U.S. Pat. Nos.

ortho to at least one or, advantageously to both hydroxyl groups. $R_b$ is preferably selected from the group consisting of unsubstituted alkyl radicals having from about 4 to about 9 carbon atoms. $R_a$ and $R_b$ are preferably tertiary alkyl groups, more preferably tertiary butyl groups.

The most preferred bisphenol compound is 2,2'-ethylidene bis(4,6-di-tert-butylphenol).

Some bisphenols suitable for use in the practice of the invention are commercially available; the bisphenols are suitably prepared by condensing an aliphatic aldehyde ($R_cCHO$) with an appropriate mono- or di-alkylated phenol as described in U.S. Pat. No. 3,068,198 which is incorporated herein by reference.

D. Polymers stabilized.

Stabilizing compositions of the invention are suitably used in compositions of diene block polymers having non-elastomeric blocks. The terms "block polymers" as employed herein refer to polymeric chains containing discrete blocks of homopolymers or of copolymers, each block differing from the next adjacent block. The terms block polymer and block polymer encompass polymers commonly referred to as radial block polymers and linear triblock polymers. Radial block polymers are those block polymers having more than two arms or chains of block polymer coupled at or radiating from a common intersection or central point. Linear triblock polymers are block polymers having three blocks in a linear structure, schematically represented by A-B-A. The term "end blocks" refers to blocks at the terminal positions of said block polymers. The term "middle blocks" refers to blocks between the end blocks of the copolymers. Blocks comprising polymerized diene are referred to herein as polydiene blocks; blocks comprising polymerized (optionally substituted) butadiene are, referred to as polybutadiene blocks. Substituted butadienes wherein the substituents do not interfere polymerization of butadiene or formation of block copolymers are suitable for use in the practice of the invention.

The stabilizing compositions of this invention are beneficially used in diene block polymer compositions wherein the copolymer has non-elastomeric blocks comprising polymerized vinyl aromatic monomers. Such blocks are referred to herein as poly(vinyl aromatic) blocks. Vinyl aromatic monomers are monomers having a vinyl group attached to an aromatic ring such as styrene, methylstyrene, ethylstyrene, dimethylstyrene, trimethylstyrene, tertiary butylstyrene, tertiary amylstyrene, octylstyrene, 2-ethylhexylstyrene, decylstyrene and the like and including isopropenyl aromatic monomers such as alpha-methylstyrene, and the like. The stabilizing compositions are particularly advantageous in stabilizing diene block polymers having at least one poly(vinyl aromatic) block comprising at least a portion of isopropenyl aromatic monomer. Such diene block polymers and their preparation are disclosed in U.S. Pat. No. 4,427,837 which is incorporated herein by reference.

Diene block polymers stabilized by the composition of the invention desirably have at least one block comprising polymerized butadiene or substituted butadiene. Stabilizing compositions of the invention are suitably used to improve the thermal stability of diene block polymers comprising at least about five percent by weight based on total weight of polymer of polybutadiene block. The stabilizing compositions are preferably used in block polymers having from about 15 to about 85 percent by weight polybutadiene blocks. More preferably, the block polymers comprise at least about 20 weight percent polymerized butadiene, most preferably at least about 30 weight percent polymerized butadiene. Diene copolymers having from about 2 to about 40 percent polydiene block are generally resinous, non-elastomeric, moldable polymers. Such non-elastomeric block polymers are particularly suitable for packaging exposed to wide ranges of temperatures such as for packaging of frozen foods. Copolymers having greater than about 50 percent polybutadiene block are generally elastomeric, rubbery polymers. Diene block polymers having from about 40 to about 50 percent by weight of polybutadiene blocks are generally soft polymers having a gradation of elastomeric properties.

Blends of diene block polymers with other compatible polymers, for example polymers, copolymers or interpolymers of monomers such as propylene, ethylene, styrene, vinyl toluene, and the like, and mixtures thereof are also stabilized by the compositions of the invention. In blends, as in copolymers, activity of the stabilizing composition of the invention is generally related to the amount of diene block polymer. The stabilizing composition of the invention, or components of that composition, are also effective to stabilize some of the polymers that are optionally present in such blends, but the stabilizing composition is generally increasingly necessary and effective as the proportion of diene block polymer in the overall blend increases. The stabilizing composition is advantageously used to stabilize polymer compositions consisting essentially of diene block polymers.

Since the tendency toward deterioration of physical characteristics on exposure to heat and/or oxygen is apparently at least partially related to crosslinking of the unsaturation present in the elastomeric blocks of the diene block polymer, the necessity for, and efficacy of the stabilizing compositions of the invention also increases with the amount of unsaturation in a block polymer.

Diene block polymers can be blended with additives such as fillers, pigments and lubricants. Appropriate pigments and fillers are, for example, flour, cotton, shredded or chopped cloth, talc, chopped canvas, paper pulp forms, asbestos, powdered mica, calcium carbonate, carbon, graphite, quartz, diatomaceous silica, fibrous glass, barytes, calcium silicate, iron, barium sulfate, litharge clay and titanium dioxide. Typical lubricants are mineral oil, natural and synthetic waxes, fatty acids such as stearic acid, alkaline earth and heavy metal stearates, and aliphatic alcohols, ketones, esters and epoxides having from about 16 to about 60 carbon atoms in the molecule, including stearyl alcohol, palmitone, behenone, oleone, cetyl palmitate, 1,2-epoxydocosane, and isooctyl epoxystearate.

E. Use of stabilizer composition.

An amount of hydroxyphenylalkylenyl isocyanurate/polyphenylene diphosphonite stabilizer combination effective to enhance the resistance of the block polymer to deterioration on exposure to heat and/or oxygen is used in the practice of the invention. Exposure to oxygen includes exposure to air. Small amounts are generally adequate. Amounts within the range of from about 0.2 to about 6 percent total stabilizers by weight in a diene block polymer composition are generally satisfactory. Advantageously, from about 1 to about 2.5 percent by weight of stabilizer composition based on polymer is employed for optimum stabilization. Amounts of hydroxyphenylalkylenyl isocyanurate within the range of from about 0.1 to about 3 percent by weight based on the weight of block polymer, and amounts of polyphenylene diphosphonite within the range of from about 0.1 to about 3 percent by weight based on diene block polymer are generally preferred. More preferably, from about 0.75 to about 1.5 percent by weight of isocyanurate and from about 0.25 to about 1 percent by weight (based on total weight of polymer) of diphosphonite are employed for optimum enhancement of resistance to degradation of physical properties.

An amount of alkylidene bisphenol effective to reduce discoloration in a diene block polymer system is beneficially used with the hydroxyphenylalkylenyl isocyanurate and diphosphonite stabilizing composition of the invention. The effective amount to reduce discoloration depends on the amount of hydroxyphenylalkylenyl isocyanurate and polyphenylene diphosphonite used, the basicity of the polymer system and conditions to which the system is to be exposed or subjected for processing, e.g. devolatilization of solvent or forming by molding or extrusion. The more isocyanurate and diphosphonite in the composition, the more alkylidene bisphenol is needed. When a ratio of parts by weight isocyanurate to parts by weight diphosphonite of about 2:1 is used for thermal or oxidative stabilization, a suitable ratio of isocyanurate to diphosphonate to bisphenol for color stabilization is preferably in the range of from about 2:1:2 to about 2:1:0.4. The proportion of alkylidene bisphenol is advantageously from about 0.04 to about 6 percent by weight based on weight of diene block polymer, preferably from about 0.04 to about 3 percent, and more preferably from about 0.1 to about 2 percent by weight based on diene block polymer present in a polymer composition.

A stabilizing composition of the invention is formed by mixing two or more of the components either as a dry blend or in a suitable liquid medium. A medium is suitably a dispersing medium, a solvent, an emulsion and the like, such as xylene, cyclohexanone, alpha-methylstyrene, ethyl benzene and the like. Suitable ratios of isocyanurate compound to diphosphonite compound effective to achieve stability to heat or oxygen are used. Such ratios are generally from about 30:1 to about 1:30, preferably from about 3:1 to about 1:3, most preferably from about 3:1 to about 1:1. The resulting mixture may then be added to the block polymer before or, alternatively, after it is isolated from a solution or medium in which it was formed. Individual components of the stabilizing composition may, alternatively, be added to the block polymer before or after it is removed from its reaction medium. Generally, it is advantageous to add the stabilizing composition or its components to the copolymer before it is separated from its reaction medium when separation will involve conditions that may degrade the copolymer, e.g. heat or exposure to oxygen. The stabilizing composition of the invention as a mixture or as individual components are, alternatively, mixed with melted or softened isolated polymers or with polymer in a liquid medium such as a solution, latex, emulsion or the like. If desired, some or all of the components of the stabilizing composition may be added to a portion of the diene block polymer thereby forming an additive masterbatch. The masterbatch is added to quantities of polymer to be stabilized.

The stabilizer compositions of the invention are incorporated in diene block polymers in suitable mixing equipment, such as a mill, a Banbury mixer, an extruder, and the like. If incorporated individually, the stabilizers are suitably added to the block polymer during processing or compounding thereof.

After incorporation of the compositions of the invention, diene block polymers have enhanced stability on exposure to heat and oxygen. That stability is evident in melt flow behavior of the copolymers. Much deterioration of copolymers containing polydiene segments is the result of crosslinking which inhibits flow of polymers when heated. As crosslinking and the associated deterioration take place, the melt flow rate approaches zero. The melt flow rate is, therefore, a useful measure of the stability of the polymers to such deterioration and crosslinking.

In the following examples, melt flow rate is measured in standard equipment which involves a heated vertical cylindrical chamber having a constricted opening in the bottom end thereof. After the chamber is heated to the designated temperature it is filled with solid particulate polymer. A plunger of designated weight is inserted on top of the polymer and used to compact the polymer somewhat. Polymer begins to melt and flow through the constricted opening in the bottom of the chamber. Initial polymer is removed at the beginning of a designated time period. Strands of polymer which flow out at the designated time intervals are removed at the end of each interval and weighed. The weights are reported in grams per ten minute intervals. The procedure is a modification of ASTM D-1238 in that melt flow is measured after designated periods of time, before and after the standard 5 minute time period.

In the examples, the enhanced thermal oxidative and color stability of diene block polymer compositions containing stabilizer compositions of the instant invention is exemplified. The following examples are divided into six series of compositions. Each composition within a series utilizes polymer from a single preparation thereof.

Hydroxyphenylalkylenyl isocyanurates are exemplified by tris (3,5-di-tert-butyl-4-hydroxybenzyl) isocyanurate. Polyphenylene diphosphonites are exemplified by tetrakis (2,4-di-tert-butylphenyl) 4,4'-biphenylene diphosphonite. Alkylidene bisphenols are exemplified by 2,2'-ethylidene bis (4,6-di-tert-butylphenol). The exemplary compounds are merely illustrative members of the families of compounds useful for stabilization in the practice of the inventions and should not be interpreted as limiting the scope of the invention.

Diene block copolymers used in the following examples are prepared by the process of U.S. Pat. No. 4,427,837 using 1,3-phenylene-bis(3-methyl-1-phenyl-pentylidene)-bis(lithium) as difunctional lithium initiator and alpha-methylstyrene as solvent. Percentage composition of the polymers is determined by Nuclear Magnetic Resonance (NMR) and expressed in weight percent of a given monomer per weight of total monomer. Molecular weight is peak molecular weight as determined by gel permeation chromatography. Peak molecular weight is the molecular weight of the polymer forming the highest point on a gel permeation curve.

In the examples below, percentages are weight percentage based on total weight of polymer. Examples of the invention are numbered, while comparative samples, which are not examples of the invention, are designated alphabetically.

SERIES I—EXAMPLES 1 AND 2; COMPARATIVE SAMPLE A

The diene block polymer used in Series I is a triblock polymer having 32.7 percent styrene and 33.4 percent alpha-methylstyrene in the form of end blocks and about 33.9 percent polybutadiene in a middle block. The peak molecular weight is 113,000.

The polymer is obtained as a syrupy mixture containing 14 percent by weight polymer in alphamethylstyrene as a major solvent containing small amounts of other hydrocarbons including cyclohexane and toluene. The mixture is removed from a reactor apparatus, in which the polymer has been prepared, into a one gallon (3.78 liters (l)) glass container which has been flushed with nitrogen and contains 5 ml. of isopropyl alcohol. The container is shaken by hand. Several small lumps of dry ice are added to neutralize the mixture. The mixture is then transferred to a 3-liter flask on a rotary evaporator via a dip tube and vacuum. On the rotary evaporator, the mixture is concentrated to 31.3 percent by weight polymer in alpha-methylstyrene. Hot water at a temperature of about 95° C. is used to heat the mixture during evaporation. An air aspirator is used to maintain vacuum.

After concentration, the vacuum is released and air is allowed to enter the container. Concentrated mixture is poured into a storage bottle and kept at room temperature until test samples are prepared. A sample of 95.8 grams (g) of the mixture corresponding to 30 g of polymer, is placed in an eight ounce (240 milliliter (ml)) glass bottle for each sample.

mer is prepared, and its melt flow rate is measured as in Series I. The melt flow rates are shown in Table II.

TABLE II

| | Melt Index Stability Studies | | | | | | |
|---|---|---|---|---|---|---|---|
| | Melt Flow Rate (g/10 min.) Schedule I | | | | | | |
| Additives | 3 min. | 5 min. | 10 min. | 15 min. | 20 min. | 25 min. | 30 min. |
| Series II Ex. of the invention | | | | | | | |
| Ex. 3 1% Good-rite ® 3144[1], 1% P-EPQ ®[1] | 0.62 | 0.56 | 0.38 | 0.26 | 0.20 | 0.17 | 0.12 |
| Series II comparative sample: | | | | | | | |
| B. no stabilizers | 0.14 | 0 | | | | | |

[1]These compounds are identified in the footnotes of Table I.

Quantities of additives indicated in Table I are dissolved in about 10 ml of alpha-methylstyrene and added to a sample of the mixture. Each bottle is mechanically shaken overnight. Each sample is then poured into a compartment of an aluminum foil tray, each compartment measuring about 10×25×2 cm. The tray is placed into a vacuum oven and heated for one hour at 180° C. to evaporate alpha-methylstyrene. Polymer remaining in the trays is dry and flexible. It is cut into strips and ground in a laboratory grinder.

A melt flow rate is determined for each composition after three minutes and thereafter at five minute intervals until there is no polymer flow, the lack of which evidences crosslinking. Measurements are made in the melt flow rate apparatus described above at 230° C. using 3800 grams of weight.

Melt flow rates for each example composition are shown in Table I.

The data Table II shows the efficacy of the stabilizing composition of the invention on a diene block polymer having a higher molecular weight than had the copolymer of Series I.

SERIES III—EXAMPLES 4-12

A diene block polymer having a composition of 34.3 percent by weight butadiene 33.0 percent styrene and 32.7 percent alpha-methylstyrene is obtained as a syrup of 24.9 percent polymer in alpha-methylstyrene, as a major solvent as in Series I, and is used without concentration. The copolymer has a peak molecular weight of 95,000.

Samples are prepared as in Series I, but using 120 g of syrup corresponding to 30 g of polymer for each sample. Additives as indicated in Table III are dissolved, added, and the polymers are shaken, dried, cut and ground as in Series I. The melt flow rates of these samples are shown in Table III.

TABLE I

| | Melt Flow Rate Stability Studies | | | | | | |
|---|---|---|---|---|---|---|---|
| | Melt Flow Rate (g/10 min) Schedule I | | | | | | |
| Additives | 3 min. | 5 min. | 10 min. | 15 min. | 20 min. | 25 min. | 30 min. |
| Series 1 Ex. of the invention | | | | | | | |
| 1. 1% Good-rite ® 3114[1], 1% P-EPQ ®[2] | 3.9 | 3.9 | 3.3 | 2.8 | 2.6 | 2.3 | 2.2 |
| 2. 2% Good-rite ® 3114[1], 1% P-EPQ ®[2] | 3.2 | 3.6 | 3.2 | 3.0 | 2.8 | 2.6 | 2.5 |
| Series 1 comparative sample: | | | | | | | |
| A. no stabilizers | 1.9 | 0.5 | 0 | | | | |

[1]tris(3,5-di-t-butyl)-4-hydroxybenzyl triazinetrione, commercially available from B.F. Goodrich
[2]tetrakis(2,4-di-t-butylphenyl)4,4'-biphenylene diphosphonite, commercially available from Sandoz, Ltd.

A comparison of Examples 1 and 2 of the invention with Sample A, not having a stabilizer, shows that the polymer compositions having a mixture of hydroxyphenylalkylenyl isocyanurate and polyphenylene diphosphonite retain melt flow characteristics far better than a composition having no stabilizers.

SERIES II—EXAMPLE 3; COMPARATIVE SAMPLE B

The procedures of Series I are repeated that the diene block polymer has a composition of 34.1 percent by weight of butadiene, 33.0 percent styrene and 32.9 percent of alpha-methylstyrene, and a peak molecular weight of 144,000. It is obtained as a syrup of 15.8 percent polymer in alpha-methylstyrene as a major solvent containing minor amounts of hydrocarbons including toluene and cyclohexane.

The syrup is added to 5 ml of isopropyl alcohol, in a one-gallon (3.78 l) bottle. No dry ice is added. The syrup is concentrated to 29.5 percent polymer by weight in alpha-methylstyrene by the procedure in Series I. Each sample is 101.7 g of syrup, corresponding to 30 g of polymer.

Quantities of additives indicated in Table II are dissolved, added and shaken as in Series I. Powdered poly-

TABLE III

| | Melt Flow Rate Stability Studies | | | | | | |
|---|---|---|---|---|---|---|---|
| | Melt Flow Rate (g/10 min.) Schedule I | | | | | | |
| Additives | 3 min. | 5 min. | 10 min. | 15 min. | 20 min. | 25 min. | 30 min. |
| Series III | | | | | | | |
| 4. 1% Good-rite ® 3114, 1% P-EPQ ® | 4.5 | 5.5 | 5.5 | 5.4 | 5.4 | 5.3 | 5.2 |
| 5. 0.5% Good-rite ® 3114, 1% P-EPQ ® | 4.6 | 4.8 | 4.6 | 4.4 | 4.3 | 4.1 | 3.8 |
| 6. 2% Good-rite ® 3114, 1% P-EPQ ® | 5.9 | 6.1 | 6.3 | 6.4 | 6.4 | 6.4 | 6.3 |
| 7. 1% Good-rite ® 3114, 0.5% P-EPQ ® | 4.8 | 4.8 | 4.7 | 4.6 | 4.6 | 4.6 | 4.4 |
| 8. 0.5% Good-rite ® 3114, 0.5% P-EPQ ® | 4.8 | 4.8 | 4.4 | 4.0 | 3.8 | 3.6 | 3.4 |
| 9. 2% Good-rite ® 3114, 0.5% P-EPQ ® | 7.0 | 7.2 | 7.3 | 7.4 | | 7.3 | 7.2 |
| 10. 1% Good-rite ® 3114, 2% P-EPQ ® | 6.2 | 6.6 | | 6.4 | 6.4 | 6.4 | 6.3 |
| 11. 0.5% Good-rite ® | 5.2 | 5.4 | | 4.9 | 4.8 | 4.7 | 4.5 |

TABLE III-continued

| | Melt Flow Rate Stability Studies Melt Flow Rate (g/10 min.) Schedule I | | | | | | |
|---|---|---|---|---|---|---|---|
| Additives | 3 min. | 5 min. | 10 min. | 15 min. | 20 min. | 25 min. | 30 min. |
| 3114, 2% P-EPQ ® | | | | | | | |
| 12. 2% Good-rite ® 3114, 2% P-EPQ ® | 5.6 | 5.9 | | 5.8 | 5.8 | 5.8 | 5.7 |

The additives are identified in the footnotes of Table I.

The melt flow rate data in Table III show that the stabilizing compositions of the invention are useful over a range of concentration. Additionally, the data indicates that somewhat better stabilization is generally achieved with use of 2 percent hydroxy phenylalkylenyl isocyanurate than with 0.5 percent or 1 percent of the isocyanurate in the polymers indicated. Optimum concentrations of polyphenyl diphosphonite are inversely related to the concentrations of isocyanurate, but when the concentration of isocyanurate is at least about 2 percent in these polymers, low concentrations of diphosphonite are adequate for stabilization. Examples 1-12 show that the stabilizing compositions of the invention are useful to stabilize diene block polymers over a wide range of molecular weights thereof.

It is notable that the melt flow rates of Examples 4-12 have higher values than the melt flow rate of Examples 1-3. Those higher melt flow rates are also maintained for longer periods of time. Because the diene block polymer used in Series III has a lower molecular weight than the copolymers used in Series I and II, it flows more readily. More crosslinking is necessary to produce polymer networks incapable of flowing. Also, the copolymer of Series III is not concentrated by rotary evaporation as are the copolymers of Series I and II. The rotary evaporation process exposes a copolymer to heat and oxygen before a stabilizing composition is added. A polymer heated and exposed to oxygen before stabilizers are added generally has a lower initial melt flow rate and a more rapidly declining melt flow rate than has a similar polymer which is protected from heat and oxygen before stabilization. Exposure to heat and oxygen before stabilization is useful to accentuate differences in stabilizing power of various compositions.

Whereas some combinations alkylenyl isocyanurate and phosphorus-containing compounds different from the polyphenylene diphosphonites used in the invention may stabilize diene block polymers which have been carefully protected from exposure to heat and oxygen, the stabilizer compositions of the invention are particularly useful for thermal stabilization of diene block polymer compositions which have been subjected to harsh conditions before the stabilizing composition is added. The term "harsh conditions" is used herein to denote exposure to gases or liquids containing oxygen or exposure to temperatures sufficient to initiate deterioration of the polymer above room temperature. In the presence of oxygen, including air, temperatures such as those in above about 100° C. are considered particularly harsh. Polymers are often exposed to such harsh conditions in some steps of their processing. The stabilizing compositions of the invention are generally more effective in preventing deterioration initiated by such conditions, than are combinations of hydroxyphenylalkylenyl isocyanurates and other phosphorus-containing compounds such as distearyl pentaerythritol diphosphite, dilaurylthiodipropionate, and tris-nonylphenyl phosphite. Similarly, polymers that have been exposed to harsh conditions are generally more effectively stabilized by compositions of the invention than by combinations of polyphenylene diphosphonites and other compounds having hindered phenol functional groups.

SERIES IV—EXAMPLES 13-14; COMPARATIVE SAMPLE C

For Series IV, block polymers with polybutadiene middle blocks comprising about 61 percent by weight of the copolymer and with end blocks having 57 percent by weight alpha-methylstyrene and 43 percent by weight styrene are used. These polymers are thermoplastic elastomers. Crosslinking is a problem during melt processing. The copolymer is obtained as a syrup of 16.5 percent polymer in alpha-methylstyrene, as major solvent as in Series I, and is concentrated by rotary evaporation as in Series I to a 29.8 weight percent solution of polymer in alpha-methylstyrene as major solvent.

The additives listed in Table IV are mixed with 50 g. samples of the concentrated solutions, by shaking on a mechanical shaker until solutions appear homogeneous. Then each sample is poured into a polytetrafluoroethylene lined pan and placed in a vacuum oven at 180° C. for 1.5 hours. Rubbery polymer samples are removed from the pans and cut into strips measuring 0.16×0.64×1.5 cm.

Mastication in a Brabender mixer at 60 revolutions per minute (RPM) with the Brabender oil temperature at 180° C. simulates processing conditions. Fifty gram samples of the polymer strips are each masticated under these conditions for ten minutes.

After mastication in the Brabender mixer, a one gram portion of each sample is mixed with about ten milliliters of methylene chloride and shaken 15 hours, then observed for complete solution or remaining gel. A soluble polymer, free of gels evidences a stable polymer. Gels indicate crosslinking.

TABLE IV

| Brabender Mixer Studies | |
|---|---|
| Additives | Polymer Solubility |
| Series IV Examples of the Invention | |
| 13. 1% Good-rite ® 3114, 0.75% P-EPQ ® | Light gels |
| 14. 1.5% Good-rite ® 3114, 0.75% P-EPQ ® | Soluble |
| Series IV Comparative Sample | |
| C. Blank - No additives | Completely Gelled |

These additives are identified in the footnotes of Table I.

In Series IV a second test for stability verifies that the stabilizing composition of the invention is highly effective.

Although heat stability of diene block polymers is enhanced by composition of a hydroxy-phenylalkylenyl isocyanurate and a polyphenylene diphosphonite as is demonstrated in Series I-IV, the heated compositions exhibit various degrees of yellowness. The examples below show the surprising utility of alkylidene bisphenols, exemplified by 2,2'-ethylidene bis (4,6-di-tert-butylphenol), commercially available from Schenectady Chemicals under the trade designation Isonox ® 129, for inhibiting yellowing of diene block polymers when exposed to elevated temperatures.

SERIES V—EXAMPLES 15-16

For Series V, a polymer syrup containing 24.37 percent polymer by weight in alpha-methylstyrene as major solvent containing minor amounts of other hydrocarbons including toluene and cyclohexane is removed from a reactor into a one gallon (3.78 l) glass container which has been flushed with nitrogen. The polymer is a triblock polymer having 25.5 percent by weight polybutadiene as the center block and 74.5 percent end blocks of styrene-alpha-methylstyrene random copolymer having a ratio of alpha-methylstyrene to styrene of 49:51. The peak molecular weight is 32,000.

The polymer is treated with 5 ml of isopropyl alcohol and several lumps of dry ice. Before use, 626 g. of the polymer syrup is mixed with 0.3 ml. of glacial acetic acid.

Two polymer solutions are prepared. For each solution, an amount of polymer syrup as indicated in Table V is weighed into a 1 oz. (30 ml.) bottle. The amount of polymer is calculated based on the weight of polymer syrup and its percent solids. The desired stabilizers are then added. The bottles are placed on a laboratory mechanical shaker for at least 1 hour. Polymer solutions are poured into aluminum cups of 3 inch (7.6 cm) diameter and devolatilized in a vacuum oven for 3.5 hours. (The oven is preheated to 190° C.) The ingredients used and the observed polymer color are given in Table V.

phenylalkylenyl isocyanurate and a polyphenylene diphosphonite.

SERIES VI—EXAMPLES 17-21

For Series VI, 77.28 kilograms of polymer syrup containing 32.34 percent polymer by weight in alpha-methylstyrene as the major solvent, having therein minor amounts of hydrocarbons including toluene and cyclohexane is obtained under nitrogen. The syrup is treated with 40.5 ml. of glacial acetic acid. A 2.6 Kg sample of the polymer syrup is placed into a one gallon glass container, having 7 g of 2,6-di-tertiary butyl-4methyl phenol (0.2 percent based on weight of polymer).

The polymer is a triblock polymer having 26.0 weight percent polybutadiene as the center block and 74.0 weight percent end blocks of styrene-alpha-methylstyrene random copolymer having 53 percent styrene and 47 percent alpha-methylstyrene by weight. The peak molecular weight is 130,000.

Five polymer solutions are made. The same procedures described in Series IV are used for preparation of samples and measurement except that a four ounce (120 ml) bottle is used in place of a 1 ounce (30 ml) bottle. The ingredients used and polymer color observed are given in Table VI.

The stability of each polymer sample is tested by measuring its melt flow rate at 5 minute intervals up to 30 minutes under condition I of ASTM D-1238 (230° C., 3800 g of weight). The method is that described above and used in Series I for measuring melt flow rate. The results are given in Table VII.

TABLE V

| Sample No. | Polymer Syrup (grams) | Polymer (grams) | Good-rite ® 3114 grams | Sandostabl ® P-EPQ grams | Isonox ® 129 (g)* | Polymer Color observed |
|---|---|---|---|---|---|---|
| Series V Examples | | | | | | |
| 15 | 14.61 | 3.56 | 0.0353 | 0.0393 | 0.0365 | colorless |
| 16 | 14.82 | 3.61 | 0.0401 | 0.0372 | 0 | light yellow |

*2,2'-ethylidene bis(4,6-di-tert-butylphenol), commercially available from Schenectady Chemicals.

The examples of Series V show that the alkylidene bisphenols, exemplified by Isonox ® 129, inhibit yellowness in a diene block polymer composition also containing a stabilizing composition of an hydroxy-

TABLE VI

| | Ingredients Used and Polymer Color Observed | | | | | |
|---|---|---|---|---|---|---|
| Sample No. | Polymer Syrup grams | Polymer grams | Good-rite ® 3114 grams | Sandostab ® P-EPQ grams | Isonox ® 129 grams | Polymer Color observed |
| Series VI Examples | | | | | | |
| 17 | 93.33 | 30.18 | 0.30 | 0.30 | 0.30 | colorless |
| 18 | 94.35 | 30.51 | 0.46 | 0.23 | 0.08 | Off-White |
| 19 | 93.99 | 30.40 | 0.30 | 0.23 | 0.18 | Colorless |
| Series VI for Comparison | | | | | | |
| 20 | 93.40 | 30.21 | 0.60 | 0.30 | 0 | Bright Yellow |
| 21 | 93.68 | 30.30 | 0.45 | 0.23 | 0 | Bright Yellow |

TABLE VII

| | Melt Stability | | | | | | | | |
|---|---|---|---|---|---|---|---|---|---|
| | Good-rite ® 3114 % | Sandostab ® P-EPQ % | Isonox ® 129% | Melt Flow Rate (grams/10 min.) | | | | | |
| Sample No. | | | | 5 min. | 10 min. | 15 min. | 20 min. | 25 min. | 30 min. |
| Series VI Examples | | | | | | | | | |
| 17 | 1 | 1 | 1 | 0.74 | 0.73 | 0.71 | 0.70 | 0.67 | 0.66 |
| 18 | 1.5 | 0.75 | 0.26 | 0.63 | 0.62 | 0.61 | 0.61 | 0.61 | 0.61 |
| 19 | 1 | 0.75 | 0.6 | 0.56 | 0.56 | 0.54 | 0.53 | 0.52 | 0.52 |
| Series VI for Comparison | | | | | | | | | |

TABLE VII-continued

| | Melt Stability | | | | | | | | |
|---|---|---|---|---|---|---|---|---|---|
| | Good- | | | Melt Flow Rate (grams/10 min.) | | | | | |
| Sample No. | rite ® 3114 % | Sandostab ® P-EPQ % | Isonox ® 129% | 5 min. | 10 min. | 15 min. | 20 min. | 25 min. | 30 min. |
| 20 | 2 | 1 | — | 0.69 | 0.69 | 0.69 | 0.69 | 0.69 | 0.70 |
| 21 | 1.5 | 0.75 | — | 0.60 | 0.60 | 0.60 | 0.60 | 0.59 | 0.60 |

The examples in Series VI illustrate some of the proportions in which 2,6-ditertiary butyl-4-methylphenol is effective in reducing discoloring on heating.

Exceptional heat stability is achieved by using the composition of the invention comprising a hydroxyphenylalkylenyl isocyanurate and a polyphenylene diphosphonite. Addition of at least one alkylidene bisphenol makes the combination even more useful in stabilizing diene block polymers. The compositions of the invention exhibit enhanced resistance to deterioration on exposure to elevated temperatures not found using other combinations of hydroxyphenyl or isocyanurate compounds and phosphorus compounds. Diene block polymer compositions containing isocyanurate and diphosphonite compounds according to the practice of the invention which composition also contain alkylidene bisphenols generally exhibit less yellowing than do diene block polymer compositions containing isocyanurate and diphosphonite compounds with other types of phenolic compounds.

The scope of this invention is not limited to the copolymers, ingredients or proportions illustrated in the examples. Rather, the examples illustrate specific additives and polymers of the types useful in the practice of the invention. Other members of the group of compounds represented by Formulas I through VI are, optionally, substituted for the exemplary compounds. Proportions used in the examples illustrate a few specific amounts within effective ranges of proportions. Other additives including other stabilizers, pigments, dyes, fillers, brighteners and the like are optionally present. The diene block polymers are optionally blended with other polymers compatible therewith.

We claim:

1. A stabilizing composition of matter for enhancing the resistance of at least one block polymer comprising at least one non-elastomeric block and at least one polybutadiene block to deterioration on exposure to heat, oxygen or combinations thereof comprising (i) at least one hydroxyphenylalkylenyl isocyanurate of the formula:

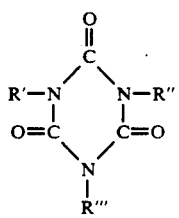

Formula I wherein R' is a hydroxyphenylalkylenyl radical of the formula:

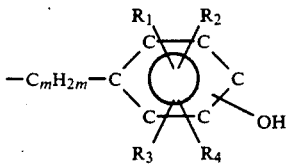

Formula II where m is an integer of from 1 to about 4, $R_1$ is an alkyl radical having from 1 to about 20 carbon atoms, which alkyl radical is unsubstituted or inertly substituted, and $R_1$ is positioned immediately adjacent to the hydroxy group on the ring; each of $R_2$, $R_3$, and $R_4$ are independently selected from the group consisting of hydrogen and alkyl, aryl or alkylaryl radicals containing from 1 to about 20 carbon atoms, which alkyl, aryl or alkylaryl radicals are unsubstituted or inertly substituted, and R" and R''' are independently selected from the group consisting of hydrogen, and alkyl radicals containing from 1 to about 20 carbon atoms, which alkyl radicals are unsubstituted or inertly substituted, and groups described by Formula II; (ii) at least one polyphenylene diphosphonite of the formula:

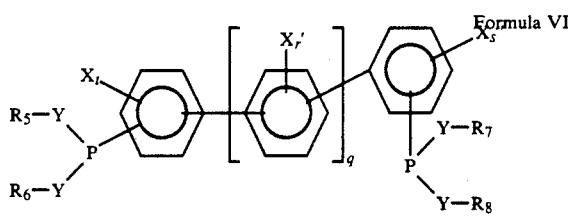

Formula VI wherein each of $R_5$, $R_6$, $R_7$ and $R_8$ is, independently, an unsubstituted hydrocarbon radical or inertly substituted hydrocarbon radical, said hydrocarbon radical being selected from the group consisting of alkyl groups, cycloalkyl groups and alkylaryl groups, each having from about 3 to about 20 carbon atoms; Y is oxygen or sulfur; q is 0 or 1; X, X', X" are independently hydrogens, or inert substituents; and r, s and t are integers from 1 to about 4; and (iii) at least one alkylidene bisphenol of Formula VI:

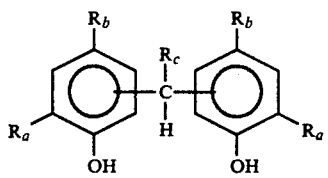

FORMULA VI wherein $R_c$ is hydrogen or an alkyl radical of from the group consisting of alkyl radicals having from 1 to about 8 carbon atoms, which radical is unsubstituted or inertly substituted, $R_a$ is selected from the group consisting of hydrogen and alkyl radicals having from about 4 to about 9 carbon atoms, which radical is unsubstituted or inertly substituted, and $R_b$ is selected from the group consisting of alkyl radical having from about 4 to about 9 carbon atoms, which radical is unsubstituted or inertly substituted.

2. A process of enhancing the resistance of polybutadiene block polymers to deterioration on exposure to heat, oxygen or combinations thereof comprising mixing therewith a stabilizing composition comprising (i) at least one hydroxyphenylalkylenyl isocyanurate of the formula:

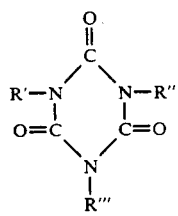

Formula I wherein R' is a hydroxyphenylalkylenyl radical of the formula:

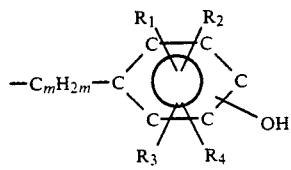

Formula II where m is an integer of from 1 to about 4, $R_1$ is an alkyl radical having from 1 to about 20 carbon atoms, which radical is unsubstituted or inertly substituted, and $R_1$ is positioned immediately adjacent to the hydroxy group on the ring; each of $R_2$, $R_3$, and $R_4$ are independently selected from the group consisting of hydrogen and alkyl, aryl or alkylaryl radicals containing from 1 to about 20 carbon atoms, which alkyl, aryl or alkylaryl radicals are unsubstituted or inertly substituted, and R" and R''' are independently selected from the group consisting of hydrogen, and alkyl radicals containing from 1 to about 20 carbon atoms, which alkyl radicals are unsubstituted or inertly substituted, and groups described by Formula II; (ii) at least one polyphenylene diphosphonite of the formula:

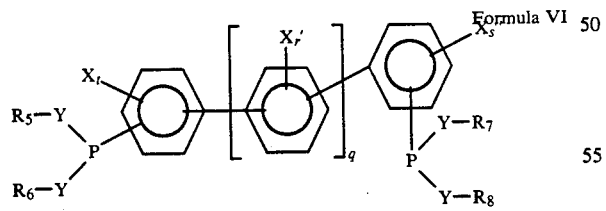

Formula VI wherein each of $R_5$, $R_6$, $R_7$ and $R_8$, is, independently, an unsubstituted hydrocarbon radical or inertly substituted hydrocarbon radical, said hydrocarbon radical being selected from the group consisting of alkyl groups, cycloalkyl groups and alkylaryl groups, each having from about 3 to about 20 carbon atoms; Y is oxygen or sulfur; q is 0 or 1; X, X', X" are independently hydrogens, or inert substituents; and r, s and t are integers from 1 to about 4; and (iii) at least one alkylidene bisphenol of Formula VI:

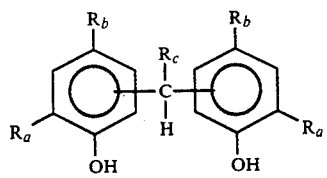

FORMULA VI wherein $R_c$ is hydrogen or an alkyl radical selected from the group consisting of alkyl radicals having from 1 to about 8 carbons atoms, which radical is unsubstituted or inertly substituted, $R_a$ is selected from the group consisting of hydrogen and alkyl radicals having from about 4 to about 9 carbon atoms, which radical is unsubstituted or inertly substituted; and $R_b$ is selected from the group consisting of alkyl radicals having from about 4 to about 9 carbon atoms, which radical is unsubstituted or inertly substituted.

3. A stabilized composition of matter comprising (a) at least one block polymer comprising at least one non-elastomeric block and at least one block comprising at least one polymerized conjugated diene and (b) a stabilizing composition in an amount effective to improve heat or oxidative stability of the block polymer, said composition comprising (i) at least one hydroxyphenylalkylenyl isocyanurate of the formula:

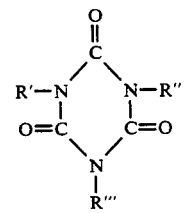

Formula I wherein R' is a hydroxyphenylakylenyl radical of the formula:

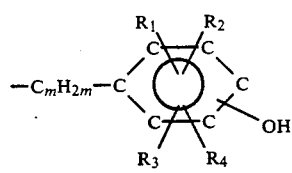

Formula II where m is an integer of from 1 to about 4, $R_1$ is an alkyl radical having from 1 to about 20 carbon atoms, which radical is unsubstituted or inertly substituted, and $R_1$ is positioned immediately adjacent to the hydroxy group on the ring; each of $R_2$, $R_3$, and $R_4$ are independently selected from the group consisting of hydrogen and alkyl, aryl or alkylaryl radicals containing from 1 to about 20 carbon atoms, which alkyl, aryl or alkylaryl radicals are unsubstituted or inertly substituted; and R" and R''' are independently selected from the group consisting of hydrogen, and alkyl radicals containing from 1 to about 20 carbon atoms, which alkyl radicals are unsubstituted or inertly substituted, and groups described by Formula II; (ii) at least one polyphenylene diphosphonite of the formula:

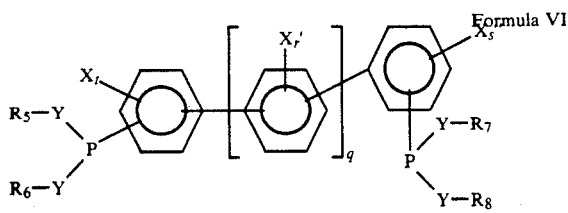

Formula VI wherein each of $R_5$, $R_6$, $R_7$ and $R_8$, is, independently, an unsubstituted hydrocarbon radical or inertly substituted hydrocarbon radical, said hydrocarbon radical being selected from the group consisting of alkyl groups, cycloalkyl groups and alkylaryl groups, each having from about 3 to about 20 carbon atoms; Y is oxygen or sulfur; q is 0 or 1; X, X', X" are independently hydrogens, or inert substituents; and r, s and t are integers from 1 to 4; and (iii) at least one alkylidene bisphenol of Formula VI:

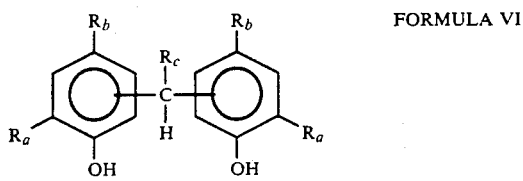

FORMULA VI wherein $R_c$ is hydrogen or an alkyl radical selected from the group consisting of alkyl radicals having from 1 to about 8 carbons, which radical is unsubstituted or inertly substituted, $R_a$ is selected from the group consisting of hydrogen and alkyl radicals having from about 4 to about 9 carbon atoms, which radical is unsubstituted or inertly substituted; and $R_b$ is selected from the group consisting of alkyl radicals having from about 4 to about 9 carbon atoms, which radical is unsubstituted or inertly substituted.

4. The stabilizing composition of claim 1 wherein in the hydroxyphenylalkylenyl isocyanurate of Formula, I, R" and R'" are described by Formula II and at least one of $R_2$, $R_3$ and $R_4$ are hydrogen while $R_1$ is a tertiary alkyl radical.

5. The stabilizing composition of claim 1 wherein the hydroxyphenylalkylenyl isocyanurate (i) is of the formula:

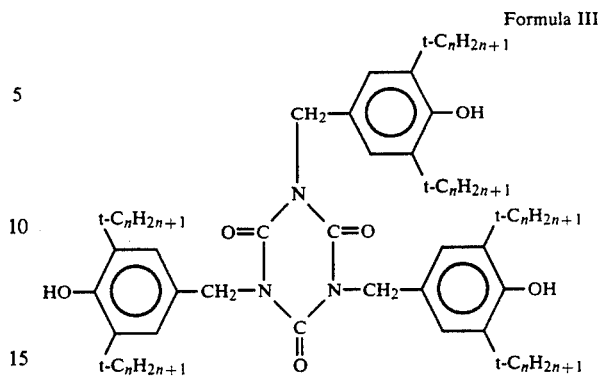

Formula III wherein n is an integer of from 4 to about 8.

6. The stabilizing composition of claim 1 wherein the hydroxyphenylalkylenyl isocyanurate (i) is tris-(3,5-di-t-butyl)-4-hydroxybenzyl triazinetrione.

7. The stabilizing composition of claim 1 wherein in Formula IV for the polyphenylene diphosphonite (ii) Y is oxygen and $R_5$, $R_6$, $R_7$ and $R_8$ are tertiary alkyl substituted phenyl moieties.

8. The stabilizing composition of claim 1 wherein the polyphenylene diphosphonite (ii) has the formula:

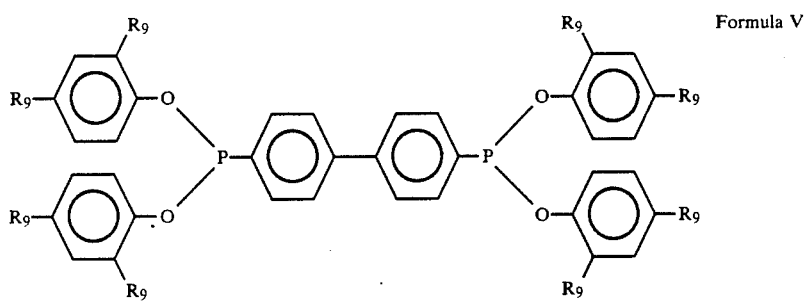

Formula V wherein the $R_9$ groups are identical or different and each represents a linear or branched alkyl group having from 1 to about 10 carbon atoms.

9. The stabilizing composition of claim 1 wherein the polyphenylene diphosphonite is tetrakis (2,4-di-t-butylphenyl)-4,4'-biphenylene diphosphonite.

10. The stabilizing composition of claim 7 wherein in the hydroxyphenylalkylenyl isocyanurate of Formula I, R" and R'" are described by Formula II and at least one of $R_2$, $R_3$ and $R_4$ are hydrogen while $R_1$ is a tertiary alkyl radical.

11. The stabilizing composition of claim 1, wherein the polyphenylene diphosphonite (ii) is tetrakis (2,4-di-t-butylphenyl)-4,4'-diphenylene diphosphonite and the hydroxyphenylalkylenyl isocyanurate (i) is tris-(3,5-di-t-butyl)-4-hydroxybenzyl triazinetrione.

12. The stabilizing composition of claim 1, additionally comprising an effective amount of (iii) at least one alkylidene bisphenol of the formula:

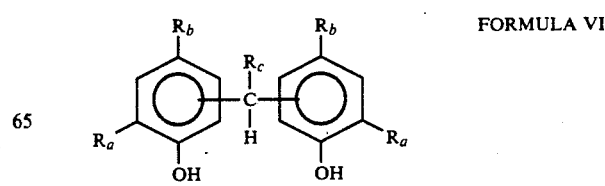

FORMULA VI wherein $R_c$ is hydrogen or an alkyl radical of from 1 to about 8 carbon atoms, which radical is unsubstituted or inertly substituted, $R_a$ is selected from the groups consisting of hydrogen and alkyl radicals having from about 4 to about 9 carbon atoms, which radical is unsubstituted or inertly substituted, and $R_b$ is selected from the group consisting of alkyl radical having from about 4 to about 9 carbon atoms, which radical is unsubstituted or inertly substituted.

13. The stabilizing composition of claim 1 wherein the alkylidene bisphenol (iii) of Formula VI $R_a$ and $R_b$ are tertiary alkyl radicals and the alkylidene bridge is ortho to both hydroxyl groups.

14. The stabilizing composition of claim 1 wherein the alkylidene bisphenol is 2,2' ethylidene bis (4,6-di-tert-butylphenol).

15. The process of claim 2 wherein the block polymer stabilized comprises at least about 15% by weight of polymerized butadiene based on total polymer.

16. The process of claim 2 wherein in the hydroxyphenylalkylenyl isocyanurate of Formula I, R" and R'" are described by Formula II and at least one of $R_2$, $R_3$ and $R_4$ are hydrogen while $R_1$ is tertiary alkyl radical.

17. The process of claim 2 wherein the hydroxyphenylalkylenyl isocyanurate (i) is tris-(3,5di-t-butyl)-4-hydroxybenzyl triazinetrione.

18. The process of claim 2 wherein in the formula for the polyphenylene diphosphonite (ii) Y is oxygen and $R_5$, $R_6$, $R_7$ and $R_8$ are tertiary alkyl substituted phenyl moieties.

19. The process of claim 2 wherein the polyphenylene diphosphonite (ii) has the formula:

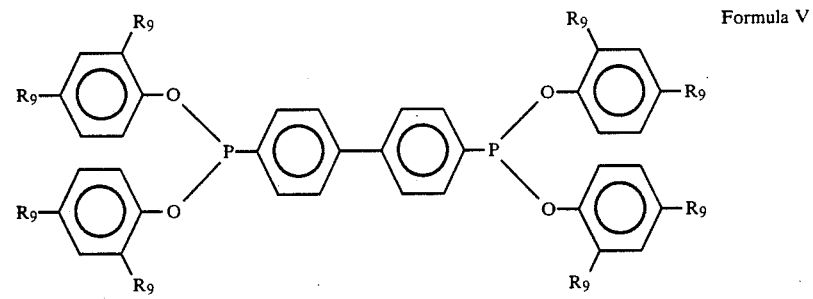

Formula V wherein the $R_9$ groups are identical or different and each represents a linear or branched alkyl group having from 1 to about 10 carbon atoms.

20. The process of claim 2 wherein the polyphenylene diphosphonite is tetrakis (2,4-di-t-butylphenyl)-4,4'-biphenylene diphosphonite.

21. The process of claim 19 wherein in the hydroxyphenylalkylenyl isocyanurate of Formula I, R" and R'" are described by Formula II and at least one of $R_2$, $R_3$ and $R_4$ are hydrogen while $R_1$ is tertiary alkyl radical.

22. The process of claim 2 wherein the polyphenylene diphosphonite (ii) is tetrakis (2,4-di-t-butylphenyl)-4,4'-biphenylene diphosphonite and the hydroxyphenylalkylenyl isocyanurate (i) is tris-(3,5-di-t-butyl)-4-hydroxybenzyl triazinetrione.

23. The process of claim 2 wherein the stabilizing composition additionally comprises an effective amount of (iii) at least one alkylidene bisphenol of the formula:

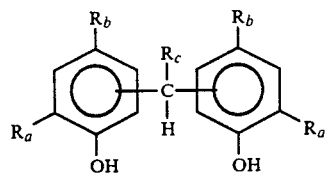

FORMULA VI wherein $R_c$ is hydrogen or an alkyl radical selected from the group consisting of alkyl radicals having from 1 to about 8 carbon atoms, which radical is unsubstituted or inertly substituted, $R_a$ is selected from the group consisting of hydrogen and alkyl radicals having from about 4 to about 9 carbon atoms, which radical is unsubstituted or inertly substituted; and $R_b$ is selected from the group consisting of alkyl radicals having from about 4 to about 9 carbon atoms, which radical is unsubstituted or inertly substituted.

24. The process of claim 2 wherein in the alkylidene bisphenol of Formula VI, (iii) $R_a$ and $R_b$ are tertiary alkyl radicals and the alkylidene bridge is ortho to both hydroxyl groups.

25. The process of claim 2 wherein the alkylidene bisphenol of Formula VI, (iii) is 2,4' ethylidene bis (4,6-di-tert-butylphenol).

26. The stabilized composition of claim 3 wherein the block polymer (a) comprises at least about 15 percent by weight of blocks comprising polymerized butadiene based on total polymer.

27. The stabilized composition of claim 3 wherein the block polymer (a) comprises about 15 to 85 percent by weight polymerized butadiene based on total polymer.

28. The stabilized composition of claim 3 wherein the block polymer (a) comprises at least about 20 percent by weight polymerized butadiene based on total polymer.

29. The stabilized composition of claim 3 wherein the block polymer (a) comprises at least about 30 percent by weight polymerized butadiene based on total polymer.

30. The stabilized composition of claim 3 wherein in the hydroxyphenylalkylenyl isocyanurate of Formula I, R" and R'" are described by Formula II and at least one of $R_2$, $R_3$ and $R_4$ are hydrogen while $R_1$ is a tertiary alkyl radical.

31. The stabilized composition of matter of claim 3 wherein the hydroxyphenylalkylenyl isocyanurate (i) is tris-(3,5-di-t-butyl)-4-hydroxybenzyl triazinetrione.

32. The stabilized composition of matter of claim 3 wherein in Formula IV for the polyphenylene diphosphonite (ii) y is oxygen and $R_5$, $R_6$, $R_7$ and $R_8$ are tertiary alkyl substituted phenyl moieties.

33. The stabilized composition of claim 3 wherein the polyphenylene diphosphonite (ii) has the formula:

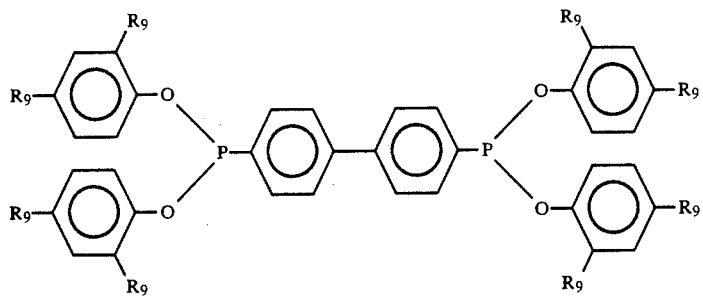

Formula V wherein the $R_9$ groups are identical or different and each represents a linear or branched alkyl group having from 1 to about 10 carbon atoms.

34. The stabilized composition of claim 3 wherein the polyphenylene diphosphonite (ii) is tetrakis (2,4-di-t-butylphenyl)-4,4'-biphenylene diphosphonite.

35. The stabilized composition of claim 3 wherein the polyphenylene diphosphonite (ii) is tetrakis (2,4-di-t-butylphenyl)-4,4'-biphenylene diphosphonite and the hydroxyhenylalkylenyl isocyanurate (i) is tris-(3,5-di-t-butyl)-4-hydroxybenzyl triazinetrione.

36. The stabilized composition of claim 3 additionally comprising an effective amount of (iii) at least one alkylidene bisphenol of the formula:

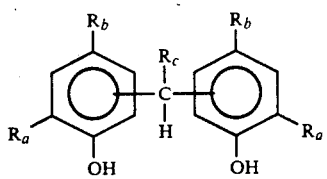

FORMULA VI wherein $R_c$ is hydrogen or an alkyl radical from the group consisting of alkyl radicals having from to about 8 carbon atoms, which radical is unsubstituted or inertly substituted, $R_a$ is selected from the group consisting of hydrogen and alkyl radicals having from about 4 to about 9 carbon atoms, which radical is unsubstituted or inertly substituted; and $R_b$ is selected from the group consisting of alkyl radicals having from about 4 to about 9 carbon atoms, which radical is unsubstituted or inertly substituted.

37. The stabilized composition of claim 35 additionally comprising an effective amount of (iii) at least one alkylidene bisphenol of the formula:

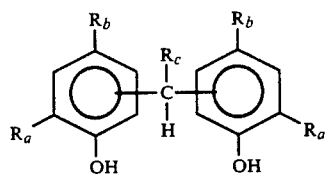

FORMULA VI wherein $R_c$ is hydrogen or an alkyl radical selected from the group consisting of alkyl radicals having from 1 to about 8 carbon atoms, which radical is unsubstituted or inertly substituted; $R_a$ is selected from the group consisting of hydrogen and alkyl radicals having from about 4 to about 9 carbon atoms, which radical is unsubstituted or inertly substituted; and $R_b$ is selected from the group consisting of alkyl radicals having from about 4 to about 9 carbon atoms, which radical is unsubstituted or inertly substituted.

38. The stabilized composition of claim 3 wherein in the alkylidene bisphenol of Formula VI (iii) $R_a$ and $R_b$ are tertiary alkyl radicals and the alkylidene bridge is ortho to both hydroxyl groups.

39. The stabilized composition of claim 35 wherein in the alkylidene bisphenol of Formula VI (iii) $R_a$ and $R_b$ are tertiary alkyl radicals and the alkylidene bridge is ortho to both hydroxy groups.

40. The stabilized composition of claim 34 wherein the alkylidene bisphenol is 2,2'-ethylidene bis(4,6-di-tert-butylphenol).

41. The stabilized composition of claim 35 wherein the alkylidene bisphenol is 2,2'-ethylidene bis(4,6-di-tert-butylphenol).

42. The stabilized composition of claim 28 wherein the block polymer has at least one poly(vinyl aromatic) block having at least a portion isopropenyl aromatic monomer.

43. The stabilized composition of claim 37 wherein the block polymer has at least one poly(vinyl aromatic) block having at least a portion isopropenyl aromatic monomer.

* * * * *